(12) United States Patent
Lee

(10) Patent No.: US 10,727,671 B2
(45) Date of Patent: Jul. 28, 2020

(54) GAS TURBINE ELECTRICAL POWER SYSTEM AND CONTROL STRATEGY FOR LIMITING REVERSE POWER SHUTDOWN

(71) Applicant: Solar Turbines Incorporated, San Diego, CA (US)

(72) Inventor: David Lee, Loyang Court (SG)

(73) Assignee: Solar Turbines Incorporated, San Diego, CA (US)

(*) Notice: Subject to any disclaimer, the term of this patent is extended or adjusted under 35 U.S.C. 154(b) by 429 days.

(21) Appl. No.: 15/671,468

(22) Filed: Aug. 8, 2017

(65) Prior Publication Data

US 2019/0052084 A1 Feb. 14, 2019

(51) Int. Cl.
*H02J 3/18* (2006.01)
*H02J 3/24* (2006.01)
*H02J 3/38* (2006.01)
*H02P 9/10* (2006.01)

(52) U.S. Cl.
CPC .......... *H02J 3/1842* (2013.01); *H02J 3/1885* (2013.01); *H02J 3/24* (2013.01); *H02P 9/10* (2013.01); *H02J 3/381* (2013.01)

(58) Field of Classification Search
USPC ........................................................ 307/24
See application file for complete search history.

(56) References Cited

U.S. PATENT DOCUMENTS

| | | | |
|---|---|---|---|
| 8,482,290 B2 | 7/2013 | Steckley et al. | |
| 9,000,611 B2* | 4/2015 | Lorenz | H02H 7/06 307/153 |
| 2006/0012344 A1* | 1/2006 | Velhner | H02P 9/305 322/23 |
| 2007/0159139 A1 | 7/2007 | Yao | |
| 2012/0218042 A1* | 8/2012 | Mueller | H02P 9/105 330/278 |
| 2016/0268940 A1 | 9/2016 | Achilles et al. | |

FOREIGN PATENT DOCUMENTS

| | | |
|---|---|---|
| CN | 202917984 | 5/2013 |
| CN | 204290274 U | 4/2015 |
| JP | 5977109 B2 | 8/2016 |
| KR | 1020100016176 | 2/2010 |

* cited by examiner

*Primary Examiner* — Rexford N Barnie
*Assistant Examiner* — Xuan Ly
(74) *Attorney, Agent, or Firm* — Brannon Sowers & Cracraft

(57) ABSTRACT

A control system for preventing electrical power supply disruptions in an electrical power system includes an electronic control unit structured to receive a power signal indicative of reactive power in an electrical generator that is produced in response to a change in an electrical load of an electrical power bus. The electronic control unit is further structured to determine voltage commands based on the power signal and vary output voltage of the electrical generator non-linearly such that occurrence of a reactive power shutdown condition is inhibited.

16 Claims, 4 Drawing Sheets

GAS TURBINE ELECTRICAL POWER SYSTEM AND CONTROL STRATEGY FOR LIMITING REVERSE POWER SHUTDOWN

TECHNICAL FIELD

The present disclosure relates generally to limiting electrical power supply disruptions in an AC electrical power system, and more particularly to non-linearly varying electrical generator output voltage to inhibit a reactive power shutdown.

BACKGROUND

Electrical power systems employing generator sets powered by combustion engines, steam, or other means are well known installations used throughout the world. Such systems can include one or more generator sets whose purpose is to provide electrical power to a local power grid such as for a municipality or a factory, or much larger installations for powering entire cities. It is common for the generators to be coupled in parallel to an electrical power bus, which can often be connected to both a local power grid and a regional power grid. Regardless of scale, it is generally desirable to operate the electrical power system without interruptions in power and with as little disturbance as practicable.

When generators are connected for parallel operation it is common for one or more of the generators to operate in so-called droop mode such that load changes on an electrical power bus cause a speed and/or an output voltage of the generator to vary to a degree that can typically be selected by the operator, such as 5% droop, 10% droop, and so on. It is also typical for another generator in the same system to be operated in isochronous mode, such that frequency serves as the basis for control in response to load changes.

Engineers have experimented for decades as to how to best control speed, voltage, frequency, and other variables in the operation of paralleling generators. When load demands are relatively stable and consistent, generator speeds and power outputs will vary relatively little. Many electrical power systems are dynamic, however, as electrical loads are connected and disconnected. In installations where multiple substantially identical generator sets are used, controlling multiple generators during transient load changes or "transients" can be relatively straightforward as the response and behavior of the similarly situated machines is relatively predictable. Many systems nevertheless have a diversity of machines with, for example, multiple gas turbine engine powered generators from different manufacturers or having different designs and/or ratings, gas turbine powered generators in parallel with reciprocating engine powered generators, gas turbines with steam turbines, or still other combinations. In these less uniform systems additional complexity as to the control characteristics and responses of the different machines can be introduced. JP2014029736(A) to Kawabata Yasahara et al. is directed to an example reverse power flow controller that apparently limits instability of supply in certain electrical power systems.

SUMMARY OF THE INVENTION

In one aspect, a control system for preventing electrical power supply disruptions in an electrical power system having a plurality of generator sets electrically connected with an electrical power bus includes a power monitor. The power monitor is structured to output a power signal indicative of reactive power in an electrical generator in one of the plurality of generator sets that is produced in response to a change in an electrical load of the electrical power bus. The control system further includes an electronic control unit structured to output voltage control commands to a voltage regulating mechanism to vary an output voltage of an electrical generator. The electronic control unit is further structured to receive the power signal, determine the voltage control commands based on the power signal, and vary the output voltage of the electrical generator non-linearly by way of the voltage control commands based on the power signal, such that occurrence of a reactive power shutdown condition is inhibited.

In another aspect, an electrical power system includes an electrical power bus structured to connect with a plurality of inductive loads, and a generator set connected to the electrical power bus that includes a combustion engine and an electrical generator. The electrical power system further includes a protection mechanism structured to shut down the electrical generator in response to occurrence of a reactive power shutdown condition. The electrical power system further includes a control system having a voltage regulating mechanism controlling an output voltage of the electrical generator, a power monitor, and an electronic control unit. The power monitor is structured to output a power signal indicative of reactive power in the electrical generator that is produced in response to a load change on the electrical power bus. The electronic control unit is structured to control the voltage regulating mechanism based on the power signal, such that the output voltage of the electrical generator is varied in a non-linear manner that compensates for the reactive power.

In still another aspect, a method of operating an electrical power system having a plurality of generator sets connected to a common electrical power bus includes operating the plurality of generator sets to provide electrical power to the common electrical power bus, and receiving a power signal indicative of reactive power produced in an electrical generator in one of the plurality of generator sets in response to a load change on the electrical power bus. The method further includes commanding varying an output voltage of the electrical generator in response to the power signal, and controlling the varying of the output voltage such that a rate of change of the output voltage is non-linear so as to inhibit the occurrence of a reactive power shutdown condition.

DETAILED DESCRIPTION

Figure 1:
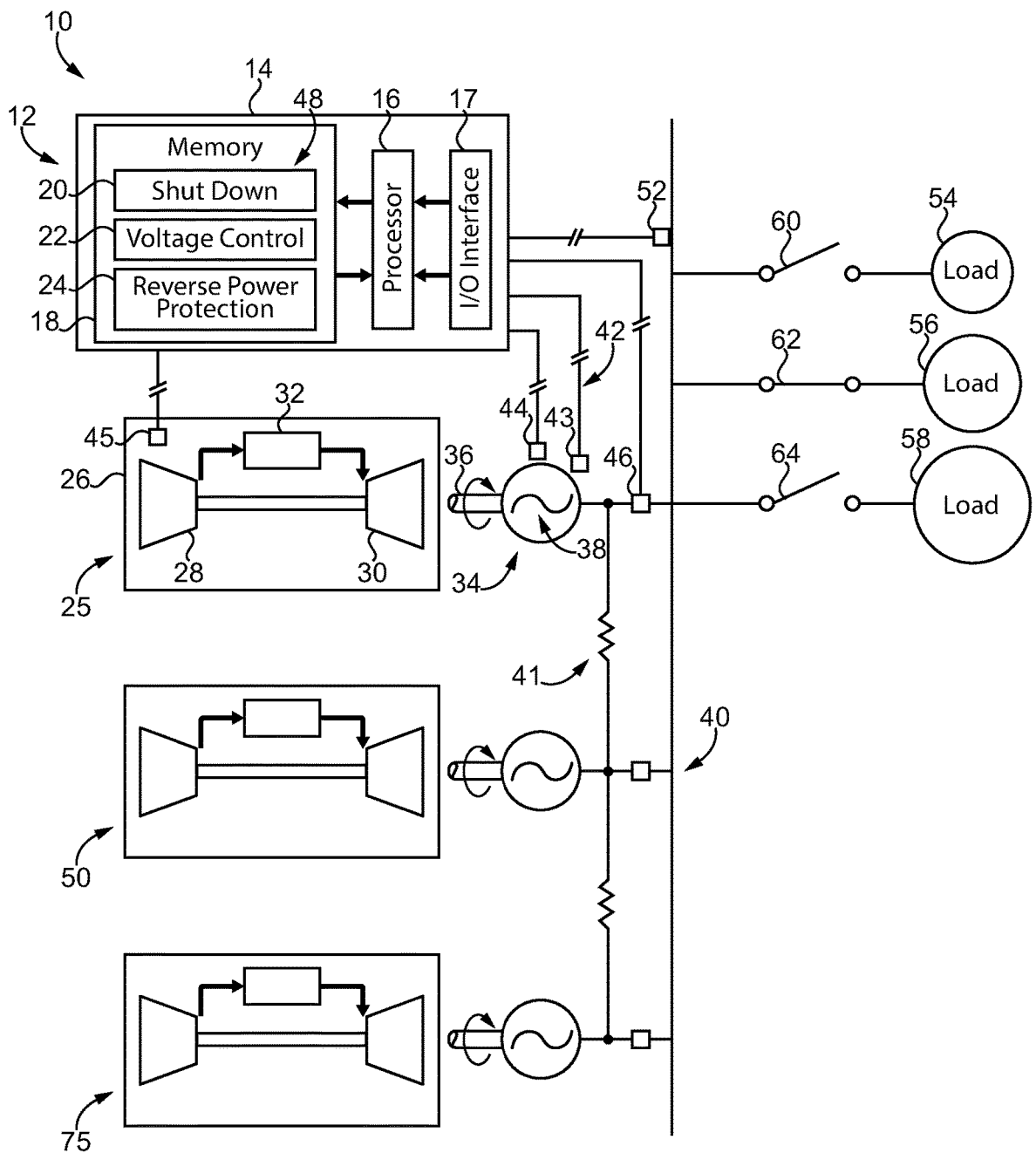
FIG. 1 is a diagrammatic illustration of an electrical power system, according to one embodiment.

Referring to FIG. 1, there is shown an alternating current (AC) electrical power system 10, according to one embodiment. Electrical power system 10 (hereinafter "system 10") may include a plurality of generator sets 25, 50 and 75 electrically connected with an electrical power bus 40. A control system 12 is provided for operating one or more of generator sets 25, 50 and 75, and for preventing electrical power supply disruptions in system 10. In the illustrated embodiment, electrical power bus 40 is structured to electrically connect with a plurality of loads 54, 56 and 58. A plurality of switches 60, 62 and 64, respectively, electrically connect loads 54, 56 and 58 with electrical power bus 40. Loads 54, 56 and 58 can include inductive loads such as electrically powered rotating machinery, electrical grids, or any of a great many other devices or systems. Those skilled in the art will appreciate that power flow between and among the various components electrically connected with electrical power bus 40 can be relatively complex and unpredictable. Those skilled in the art will also appreciate that power flow between and among loads including inductive loads can involve not only apparent power or working power, but also reactive power. When one of switches 60, 62 or 64 is opened or closed to electrically connect or disconnect the corresponding load to electrical power bus 40, reactive power may be produced in system 10 and in particular in the electrically powered or electrical generating equipment connected to electrical power bus 40.

It has been observed that the response of any one of a plurality of different generator sets with respect to reactive power can be highly unpredictable. Each of generator sets 25, 50 and 75 includes a generator, such as an electrical generator 34 shown coupled with gas turbine engine 26 by way of a prime mover 36. Gas turbine engine 26 can include a compressor 28, a turbine 30, and a combustor 32 in a generally conventional manner. Gas turbine engine 26 operates to rotate prime mover 36 to operate generator 34 in a generally conventional manner. During or in response to a change in electrical load on electrical power bus 40 as noted above, reactive power is observed in electrical generator 34. The extent and properties of reactive power produced in generator 34 can vary based upon the behavior of generator sets 50 and 75, as well as such other generator sets and other loads that are electrically connected to electrical power bus 40. If reactive power is uncontrolled, a reverse power flow condition can be produced where electrical power would flow into generator 34 and potentially damage the equipment.

Generator set 25, as well as the other generator sets electrically connected to electrical power bus 40, can be equipped with various protection or shutdown mechanisms as further discussed herein that can shut down the subject generator set and/or electrically disconnect from electrical power bus 40. Switchgear 46 is shown between generator 34 and electrical power bus 40 for such purposes. It is generally desirable to avoid shutting down a generator set or activating switchgear as the electrical power that could be produced by the generator set becomes unavailable, and restarting the generator set may require significant downtime and manual intervention. Generator sets 25, 50 and 75 may also include control mechanisms for adjusting operation or state of the associated generator to recover from a reactive power condition without requiring shutdown or activating switchgear. It has been observed that control systems protecting against reverse power shutdown conditions have various shortcomings, which can arise at least in part from the use of diverse generator sets in the same electrical power system. In some embodiments, generator set 50 might be controlled according to a TT3 control strategy, whereas generator set 75 might be controlled by way of an automated voltage regulator (AVR) strategy, and still other generator sets in electrical power system 10 (not shown) might be controlled by still another strategy such as a reactive power protection relay. Generator set 25 may be controlled by control system 12 as noted above, which can include an electronic control unit 14. In a practical implementation strategy, electronic control unit 14 could include or be integrated into a combined generator control module or "CGCM." As will be further apparent from the following description, electronic control unit 14 is uniquely configured to prevent electrical power supply disruptions by enabling generator set 25 to recover from reactive power produced in response to a load change, thereby inhibiting occurrence of a reactive power shutdown condition.

Electronic control unit 14 may include a processor 16, which can include any suitable computer processor such as a microprocessor, microcontroller, field programmable gate array (FPGA), et cetera. Electronic control unit 14 further includes an input/output interface 17 enabling outputting of control commands or signals to various controlled components of control system 12 and electrical power system 10 as further discussed herein, and the receipt of electrical data from various sensing mechanisms. A bus sensor 52 may be provided and in communication with processor 16 by way of input/output interface 17, and structured to sense a voltage, an electrical current, or both, of electrical power bus 40. Switchgear 46 may also be in communication with processor 16 by way of input/output interface 17. Also in control system 12 is included a power monitor 42 including a sensor 43, and structured to output a power signal indicative of reactive power in electrical generator 34 that is produced in response to a change in an electrical load of electrical power bus 40. Power monitor 42 could include sensor 43 as well as a separate processor (not shown) or processor 16 itself. Sensor 43 can include a voltage probe, a current probe, or both, enabling electronic control unit 14 to gather data for calculating reactive power at any given instant according to known techniques. It will therefore be appreciated that as used herein the term "power signal" contemplates both raw sensor data indicative of reactive power as well as a signal produced by processor 16 or another processor in response to calculations performed on the basis of the raw sensor data received.

Control system 12 further includes a voltage regulating mechanism 44 structured to couple with an exciter (not shown) in generator 34 to control an excitation voltage of generator 34 that is in turn used to control an output voltage of generator 34. In an implementation, electronic control unit 14 is structured to output voltage control commands to voltage regulating mechanism 44 to vary an output voltage of generator 34. Electronic control unit 14 is further structured to receive the power signal, determine the voltage control commands based on the power signal, and vary the output voltage of the electrical generator by way of the voltage control commands based on the power signal. Varying the output voltage of the electrical generator in a non-linear manner can compensate for the reactive power, such that occurrence of a reactive power shutdown condition is inhibited, as further described herein.

In the illustrated embodiment, electronic control unit 14 is structured by way of computer software stored on a computer readable memory 18 to execute these and other various functions. Memory 18 can include any suitable memory such as RAM, ROM, DRAM, SDRAM, FLASH, a hard drive, or still others. Memory 18 can store many different software modules, such as an operating system, gas turbine engine fueling control software, and still others. In the illustrated embodiment, memory 18 stores a VOLTAGE CONTROL module 22 whereby electronic control unit 14 controls output voltage of generator 34 by way of control commands to voltage regulating mechanism 44 during normal operation. Memory 18 also stores a SHUT DOWN module 20 whereby electronic control unit 14 can shut down operation of generator set 25 and/or electrically disconnect generator 34 from electrical power bus 40. A fueling control element 45 for gas turbine engine 26 is shown in FIG. 1, and could include a fuel delivery valve or the like, whose state is adjusted to a closed state by way of SHUT DOWN module 20. A REVERSE POWER PROTECTION module 24 is also stored on memory 18 and can be executed as further discussed herein to override operation of VOLTAGE CONTROL module 22 in scenarios where normal operating of generator set 25 could be expected to lead to triggering shutdown. Another way to understand the functions and interplay of the various control components stored on memory 18 and executable by processor 16 is that a normal operating strategy for voltage control may be executed much of the time, but under certain conditions would lead to triggering shutdown but for the REVERSE POWER PROTECTION component or module 24. In an implementation, electronic control unit 14 may be further structured to determine satisfaction of voltage control override criteria based on at least one of the reactive power or a change in the reactive power. In other words, criteria for overriding the normal output voltage control strategy may be established that include a level (volt ampere reactive or Var) of the reactive power, a change in the reactive power or a rate of change in the reactive power, or still other factors, that must be satisfied for the control logic to hand off between the normal output VOLTAGE CONTROL strategy and the REVERSE POWER PROTECTION strategy. It should also be appreciated that the depiction in FIG. 1 is a simplified illustration, and no limitation as to one voltage control algorithm with subroutines, or multiple separate voltage control algorithms, in either case requiring some form of logic handoff, or any other limitation is intended by way of the present description. In view of the teachings set forth herein, those skilled in the art will appreciate various different ways that control system 12 can be configured.

It will be recalled that varying of output voltage of generator 34 to inhibit the occurrence of a reactive power shutdown condition may include varying the output voltage non-linearly. In an implementation, normal voltage control as discussed herein can include controlling voltage linearly and in proportion to electrical power load on electrical power bus 40. The present disclosure reflects the discovery that non-linearly varying the output voltage, and in a practical implementation non-linearly increasing the output voltage, can inhibit occurrence of a reactive power shutdown condition. A reactive power shutdown condition could include or be contingent upon several different factors such as a rate of reactive power change, a reactive power level, a time duration at a reactive power level, or still other factors. In one implementation, the reactive power shutdown condition includes a reverse power flow condition, although it will be appreciated that the present disclosure contemplates logging a fault and addressing reactive power prior to the point at which power flow in fact reverses or other shutdown criteria such as a minimum turbine rotation speed or minimum output voltage or frequency occurs.

It will generally be desirable to operate electrical power system 10 so as to produce a consistent voltage on electrical power bus 40. Likewise, output of the generators feeding electrical power bus 40 is desirably maintained substantially constant. A load change on electrical power bus 40 can cause a change in bus voltage, in which case it is desirable to vary output voltage of the generators, including generator 34, at least temporarily. As noted above, during normal operating conditions the generator output voltage may be adjusted linearly in proportion to an electrical load or a change in an electrical load of electrical power bus 40. Where reactive power as discussed herein creates an apparent risk of occurrence of a reactive power shutdown condition, the generator output voltage can be varied according to the REVERSE POWER PROTECTION module or strategy 24 as described herein. Electronic control unit 14 may be structured to determine voltage control commands for voltage regulating mechanism 44 based upon electrical load or change in electrical load of electrical power bus 40, and also based upon the power signal. It will therefore be appreciated that voltage may be increased to accommodate or in response to an electrical load change, and electronic control unit 14 may be understood to hasten the increase in output voltage that is already occurring based on an increase in the monitored level of reactive power.

Figure 2:
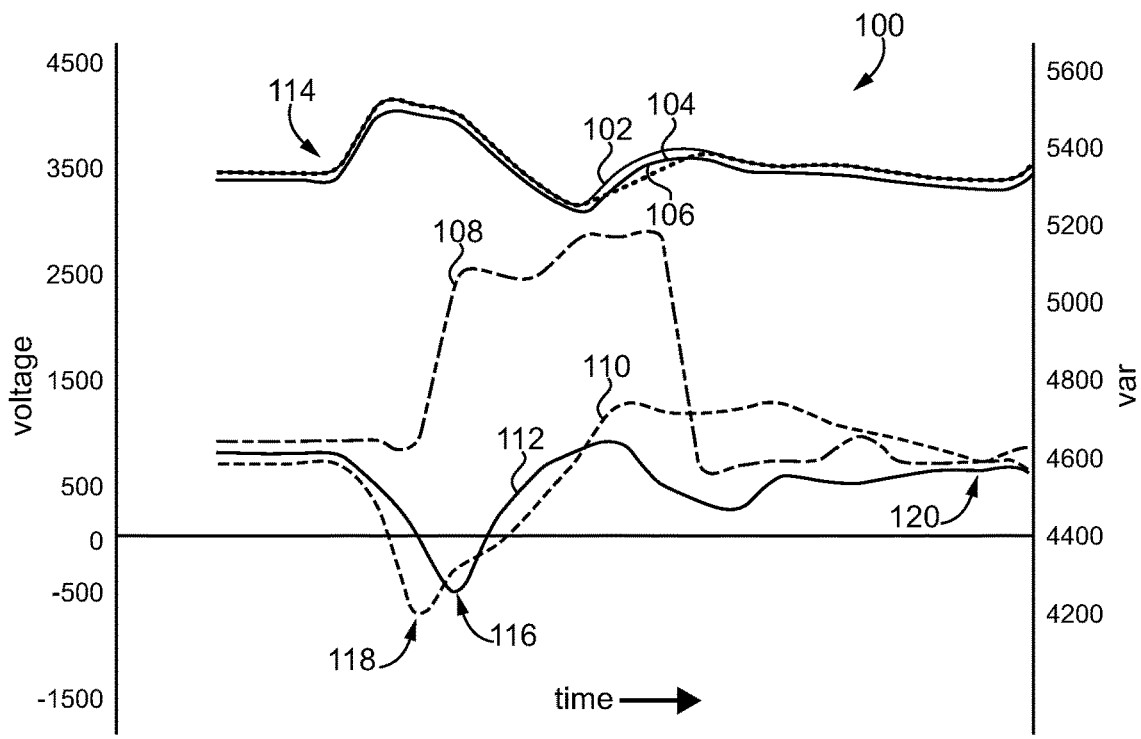
FIG. 2 is a graph illustrating electrical properties in an electrical power system during a load change.

Referring now to FIG. 2, there is shown a graph 100 illustrating several signal traces, including bus voltage 106, a first generator voltage 102, and a second generator voltage 104. Generator voltage 102 may include a generator voltage that could be observed in a generator controlled according to the present disclosure such as generator 34. Generator voltage 104 could include a generator voltage in a generator controlled according to another strategy such as the other control strategies mentioned herein. At reference numeral 114 it can be seen that all three voltages began to increase. Also depicted in FIG. 2 are traces illustrating reactive power, including a reactive power 108 that might be observed in one generator, a reactive power 110 that might be observed in another generator, and a reactive power 112 that might be observed in yet another generator. Reactive power 112 could include reactive power in a generator controlled according to the present disclosure, whereas reactive power 108 and reactive power 110 could include reactive power in generators controlled according to other strategies. Reactive power 110 might be the reactive power in a generator controlled by way of a reactive power relay, for instance. Reactive power 108 might be reactive power in a generator controlled according to TT3 control or AVR control. It should be appreciated, however, that FIG. 2 is examplary only, and the sign, patterns, or other properties of reactive power may appear quite different depending on generator configurations, control strategy, and the architecture of the subject electrical power system. It can be noted that reactive power 110 and reactive power 112 reduce following the load change on the electrical power bus, with reactive power 110 bottoming out at a location 118, and reactive power 112 bottoming out at a location 116. Reactive power 112, reactive power 110, and reactive power 108 all recover and settle back towards a nominal value as shown at reference numeral 120. In other strategies, such as CGCM control without the benefit of the present disclosure, reactive power 112 could have been expected to never recover, ultimately resulting in reverse power flow and potentially damage to the associated generator and/or associated combustion engine, or more likely total shutdown and disconnecting from electrical power bus 40 when other faults are generated. By non-linearly increasing generator output voltage of generator 34 the shutdown condition can be inhibited and generator 34 is able to recover. Another way to understand the principles at work is that, while generator output voltage of generator 34 would be increased in response to the load change on electrical power bus 40, the present disclosure enables increasing the generator output voltage faster so as to compensate for the reactive power. In an implementation, as the level of reactive power increases, the generator output voltage can be increased faster to stay ahead of the rise in the reactive power level. Electronic control unit 14 can be structured to produce the voltage control commands such that an instantaneous rate of increase of the output voltage of generator 34, for instance, is positively correlated with the level of the reactive power.

Figure 3:
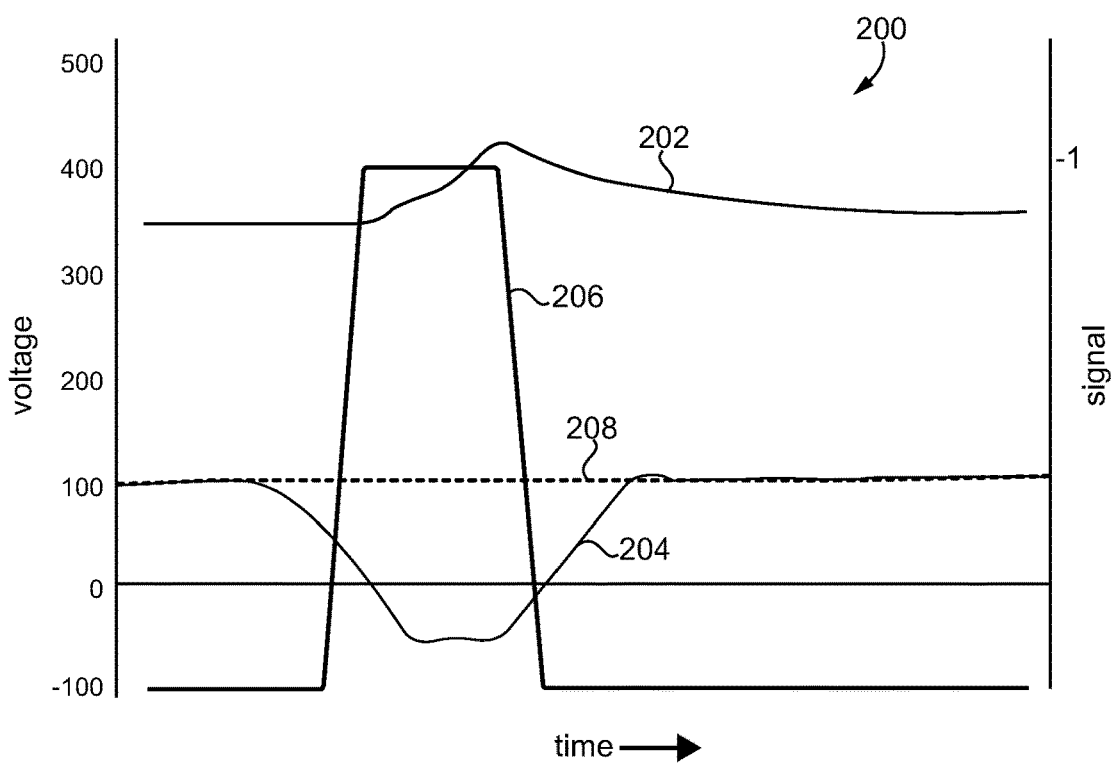
FIG. 3 is a graph illustrating electrical properties in an electrical power system during a first set of reactive power conditions.

Referring now to FIG. 3, there is shown another graph 200 illustrating electrical properties in an electrical power system controlled according to the present disclosure, including generator output voltage 202, reactive power 204, power output of the generator at 208, and a control signal at 206. It can be noted that reactive power 204 begins to reduce towards becoming negative shortly before correction of signal 206. The beginning of the change in reactive power can be understood to correspond generally to what might be observed where a load change occurs on an associated electrical power bus. It can be seen that generator output voltage 202 is increased, and according to the present disclosure will be non-linearly increased, to compensate for the reactive power so as to avoid a reactive power shutdown condition. In FIG. 3 the electrical properties might be observed where normal generator output is 350 VAC and 1,000 KW, and where the reactive power is at 5%, in other words −50 KVAR.

Figure 4:
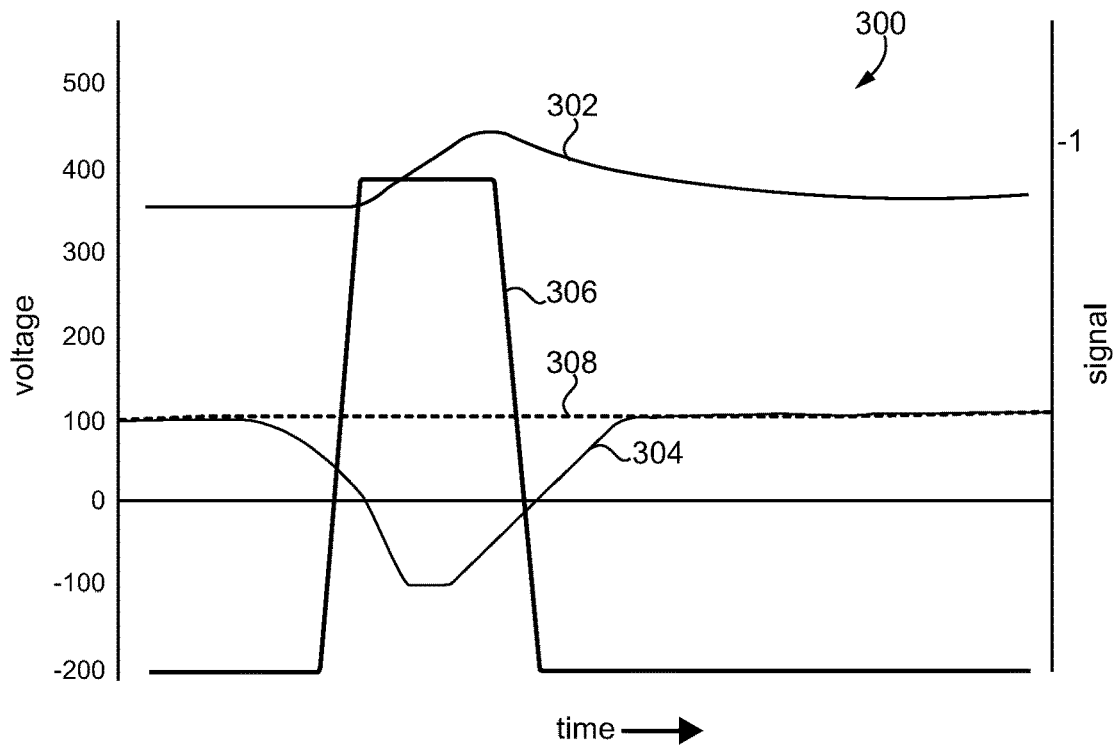
FIG. 4 is a graph illustrating electrical properties in an electrical power system during a second set of reactive power conditions.
Figure 5:
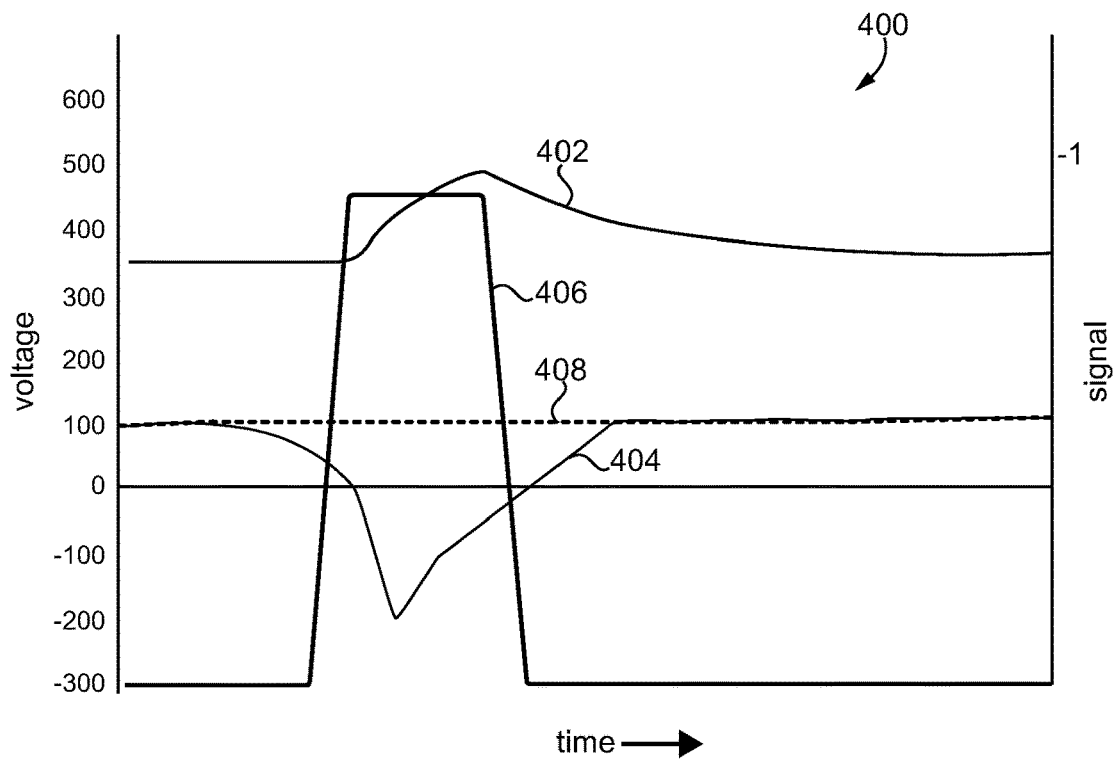
FIG. 5 is a graph illustrating electrical properties in an electrical power system during a third set of reactive power conditions.

Referring now to FIG. 4, there is shown a graph 300 illustrating what might be observed in a case where KVAR is 10%, such as −100 KVAR in a generator output at 350 VAC and 1,000 KW. Generator output voltage is shown at 302, reactive power at 304, the control signal at 306, and generator power output at 308. Referring to FIG. 5, there is shown a graph 400 illustrating electrical properties that might be observed where KVAR is at a 20% level. Generator output voltage is shown at 402, reactive power at 404, a control signal at 406, and generator output at 408. In the case of FIG. 3, a generator output voltage increase to 405 V from 350 V was required to recover. In the FIG. 4 instance a generator output voltage increase to 444 V to recover is observed. In the FIG. 5 case generator voltage increase to 485 V to recover is observed.

INDUSTRIAL APPLICABILITY

Figure 6:
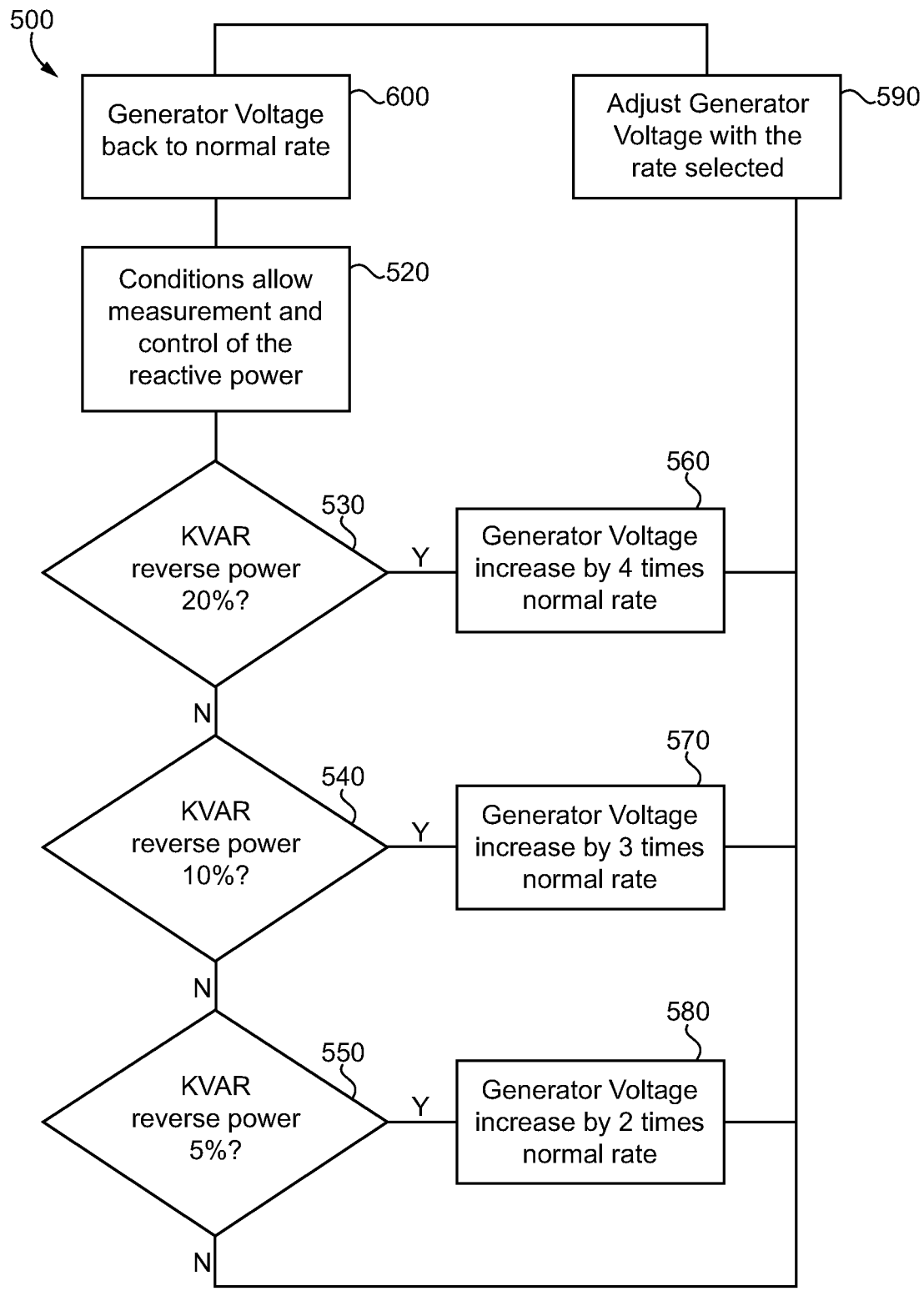
FIG. 6 is a flowchart illustrating control logic flow, according to one embodiment.

Referring to FIG. 6, there is shown a flowchart illustrating example control logic flow, according to one embodiment. In flowchart 500, at a block 520 it is determined that conditions allow measurement and control of reactive power. From block 520, the logic can advance to block 530 to query is KVAR reverse power 20%? If yes, the logic can advance to block 560 where generator voltage is increased by four times the normal rate. If no, the logic can advance to block 540 to query is KVAR reverse power 10%? If yes, the logic can advance to block 570 where generator voltage is increased by three times the normal rate. If no, the logic can advance to block 550 to query is KVAR reverse power 5%? If yes, the logic can advance to block 580 where generator voltage is increased by two times the normal rate. If no, the logic can advance to block 590 where generator voltage is adjusted with the rate selected. At block 600 generator voltage is controlled at the normal rate. It will be understood that the rate of adjustment in generator voltage if the conditions at block 550 are not true could be the normal rate of adjustment as discussed herein. It will be recalled that under ordinary voltage control conditions, in other words where criteria for voltage control override are not satisfied, generator output voltage can be maintained or varied in a standard manner.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the temis "has," "have," "having," or the like are intended to be open-ended terms. Further, the phrase "based on" is intended to mean "based, at least in part, on" unless explicitly stated otherwise.

The invention claimed is:

1. A control system for preventing electrical power supply disruptions in an AC electrical power system having a plurality of generator sets electrically connected with an electrical power bus, the control system comprising:
    a power monitor structured to output a power signal indicative of reactive power in an electrical generator in one of the plurality of generator sets that is produced in response to a change in an electrical load of the electrical power bus;
    an electronic control unit structured to:
    output voltage control commands to a voltage regulating mechanism to vary an output voltage of the electrical generator;
    receive the power signal;
    compare a level of the reactive power to a threshold level of reactive power;
    determine the voltage control commands based on the comparison of the level of the reactive power to a threshold level of reactive power;
    vary the output voltage of the electrical generator non-linearly by way of the voltage control commands; and
    inhibit occurrence of a reactive power shutdown condition based on the varying of the output voltage of the electrical generator non-linearly.

2. The control system of claim 1 wherein the electronic control unit is further structured to determine the voltage control commands based also upon an electrical load or change in electrical load of the electrical power bus.

3. The control system of claim 2 wherein the electronic control unit is further structured to increase the output voltage by way of the voltage control commands.

4. The control system of claim 3 wherein the reactive power shutdown condition includes a reverse power flow condition.

5. The control system of claim 3 wherein the electronic control unit is further structured to determine the voltage control commands so as to hasten the increase in the output voltage based on an increase in the monitored level of the reactive power.

6. The control system of claim 3 wherein the monitored level of the reactive power includes a relative level of reactive power as a proportion of true power.

7. The control system of claim 2 wherein the electronic control unit is structured to determine satisfaction of voltage control override criteria based on at least one of the reactive power or a change in the reactive power, and to determine the voltage control commands based on the power signal where the voltage control override criteria are satisfied.

8. The control system of claim 1 further comprising a voltage regulating mechanism structured to couple with an exciter in the electrical generator, and to receive the voltage control commands.

9. The control system of claim 1 wherein the power monitor includes an electrical probe structured to sense an electrical property of at least one of the electrical generator or the electrical power bus.

10. An electrical power system comprising:
   an electrical power bus structured to connect with a plurality of inductive loads;
   a generator set connected to the electrical power bus and including a combustion engine and an electrical generator;
   a protection mechanism structured to shut down the electrical generator in response to occurrence of a reactive power shutdown condition;
   a control system including a voltage regulating mechanism controlling an output voltage of the electrical generator, a power monitor, and an electronic control unit;
   the power monitor being structured to output a power signal indicative of reactive power in the electrical generator that is produced in response to a load change on the electrical power bus; and
   the electronic control unit being structured to:
   monitor a level of the reactive power based on the power signal;
   output voltage control commands to the voltage regulating mechanism to control the voltage regulating mechanism based on the power signal, such that the output voltage of the electrical generator is varied in a non-linear manner that compensates for the reactive power;
   determine the voltage control commands such that an instantaneous rate of increase of the output voltage of the electrical generator is positively correlated with the level of the reactive power; and
   hasten the instantaneous increase in the output voltage based on an increase in the monitored level of the reactive power.

11. The system of claim 10 wherein the generator set is a first generator set, and further comprising a second generator set connected to the electrical power bus and including a second combustion engine and a second electrical generator, and each of the first combustion engine and the second combustion engine including a gas turbine engine.

12. The system of claim 10 wherein the electronic control unit is further structured to control the voltage regulating mechanism based also upon an electrical load or change in electrical load of the electrical power bus.

13. A method of operating an electrical power system having a plurality of generator sets connected to a common electrical power bus, the method comprising:
   operating the plurality of generator sets to provide electrical power to the common electrical power bus;
   receiving a power signal indicative of reactive power produced in an electrical generator in one of the plurality of generator sets in response to a load change on the electrical power bus;
   commanding varying an output voltage of the electrical generator in response to the power signal; and
   controlling the varying of the output voltage such that a rate of change of the output voltage is non-linear so as to inhibit the occurrence of a reactive power shutdown condition;
   wherein the controlling of the varying of the output voltage further includes:
      controlling increasing the output voltage based on an increase in a level of the reactive power; and
      hastening increasing the output voltage based on the increase in the level of the reactive power.

14. The method of claim 13 further comprising commanding varying the output voltage of the electrical generator in proportion to the load on the electrical power bus.

15. The method of claim 14 further comprising receiving data indicative of satisfaction of voltage control override criteria, and wherein the varying of the output voltage in response to the power signal is initiated responsive to the data indicative of satisfaction of voltage override criteria.

16. The method of claim 13 wherein the operating of the plurality of generator sets includes operating gas turbine engines in each of the plurality of generator sets.

* * * * *